(12) United States Patent
Keyes

(10) Patent No.: US 10,293,528 B2
(45) Date of Patent: May 21, 2019

(54) CONTINUOUS METHOD FOR PRODUCING PRE-INSULATED PIPING

(71) Applicant: Thermacor Process, Inc., Fort Worth, TX (US)

(72) Inventor: Thomas Joseph Keyes, Fort Worth, TX (US)

(73) Assignee: Thermacor Process, Inc., Fort Worth, TX (US)

( * ) Notice: Subject to any disclaimer, the term of this patent is extended or adjusted under 35 U.S.C. 154(b) by 156 days.

(21) Appl. No.: 15/411,336

(22) Filed: Jan. 20, 2017

(65) Prior Publication Data

US 2018/0036924 A1 Feb. 8, 2018

Related U.S. Application Data

(63) Continuation-in-part of application No. 15/368,115, filed on Dec. 2, 2016.
(Continued)

(51) Int. Cl.
| | |
|---|---|
| *B29C 44/32* | (2006.01) |
| *B29C 47/02* | (2006.01) |
| *F16L 59/14* | (2006.01) |
| *B29C 44/00* | (2006.01) |
| *B29K 23/00* | (2006.01) |

(Continued)

(52) U.S. Cl.
CPC .......... *B29C 44/324* (2013.01); *B29C 44/00* (2013.01); *B29C 47/021* (2013.01); *F16L 59/143* (2013.01); *B29C 47/0023* (2013.01); *B29C 47/1036* (2013.01); *B29K 2023/065* (2013.01); *B29K 2075/00* (2013.01); *B29K 2105/04* (2013.01); *B29K 2705/00* (2013.01);
(Continued)

(58) Field of Classification Search
CPC ... B29C 47/021; B29C 47/0095; B29C 47/34; F16L 59/143; B29L 2023/225
USPC ...................... 198/670, 608, 803.1; 264/45.9
See application file for complete search history.

(56) References Cited

U.S. PATENT DOCUMENTS 3,041,700 A 7/1962 Smith
3,223,571 A * 12/1965 Straughan ............. B28B 21/925
156/187

(Continued)

FOREIGN PATENT DOCUMENTS

| DE | 2923665 A1 | 12/1980 |
|---|---|---|
| EP | 0897788 A1 | 2/1999 |

(Continued)

*Primary Examiner* — Jacob T Minskey
*Assistant Examiner* — Cedrick S Williams
(74) *Attorney, Agent, or Firm* — Whitaker Chalk Swindle & Schwartz PLLC; Charles Gunter

(57) ABSTRACT

A method for the continuous production of pre-insulated piping having an inner metal carrier pipe having an interior surface and an exterior surface and an envelope of foamed insulation surrounding the inner metal carrier pipe exterior surface. A molding apparatus is provided for forming an annulus about a pipe to be insulated into which foam can be injected. The pipe is continuously moved through the apparatus with foaming material being injected into the annulus where it is molded and cured to form a foam insulated pipe. The molding apparatus is a roller-drum having a cylindrical length and a plurality of individual rollers arranged in a series of linearly staggered, circular arrays which define the annulus where the foaming material is cured.

6 Claims, 6 Drawing Sheets

Related U.S. Application Data

(60) Provisional application No. 62/369,941, filed on Aug. 2, 2016.

(51) Int. Cl.
- B29K 75/00 (2006.01)
- B29K 105/04 (2006.01)
- B29K 705/00 (2006.01)
- B29L 23/00 (2006.01)
- F16L 59/10 (2006.01)
- F16L 59/02 (2006.01)
- B29C 47/00 (2006.01)
- B29C 47/10 (2006.01)

(52) U.S. Cl.
CPC ....... *B29L 2023/225* (2013.01); *F16L 59/028* (2013.01); *F16L 59/10* (2013.01)

(56) References Cited

U.S. PATENT DOCUMENTS

| | | |
|---|---|---|
| 3,685,546 A | 8/1972 | Sigmund |
| 3,687,765 A | 8/1972 | McLean et al. |
| 3,876,355 A | 4/1975 | Baughmann |
| 3,979,818 A | 9/1976 | Groch et al. |
| 4,134,782 A * | 1/1979 | Straughan ............. B29C 44/324 156/203 |
| 4,362,489 A | 12/1982 | Bast |
| 4,531,991 A | 7/1985 | Ziemek et al. |
| 4,844,762 A * | 7/1989 | Schroder ............... B23P 19/047 156/244.12 |
| 5,273,611 A * | 12/1993 | Webb .................. F16L 58/1063 156/392 |
| 6,547,908 B2 | 4/2003 | Keyes et al. |
| 7,037,557 B2 | 5/2006 | Keyes |
| 7,418,979 B2 | 9/2008 | Keyes |
| 7,824,595 B2 | 11/2010 | Appleby et al. |
| 9,377,150 B2 | 6/2016 | Keyes |
| 2008/0178466 A1* | 7/2008 | Keyes ................ B29C 44/1242 29/890.14 |
| 2011/0308659 A1 | 12/2011 | Oeschger |
| 2015/0375433 A1 | 12/2015 | Bronnum et al. |

FOREIGN PATENT DOCUMENTS

| | | |
|---|---|---|
| EP | 1288558 A1 | 3/2003 |
| WO | 2004003423 A1 | 1/2004 |
| WO | 2011103606 A2 | 9/2011 |

\* cited by examiner

CONTINUOUS METHOD FOR PRODUCING PRE-INSULATED PIPING

CROSS REFERENCE TO RELATED APPLICATIONS

This application is a continuation-in-part application of prior filed Ser. No. 15/368,115, filed Dec. 2, 2016, entitled "Continuous Method for Producing Pre-Insulated Piping", by the same inventor, Which in turn claimed priority from a prior filed U.S. provisional application Ser. No. 60/369,941, tiled Aug. 2, 2016, with the same title and by the same inventor.

BACKGROUND OF THE INVENTION

Field of the Invention

The present invention relates generally to fully bonded foam pre-insulated piping systems and, more specifically, to a method and apparatus for the continuous production of such piping systems.

Description of the Prior Art

Insulated pipelines are needed in a variety of situations. For example, distributed HVAC (heating, ventilation, and air conditioning) applications utilize chilled water for cooling and steam and hot water for heating. The chiller and boiler are typically contained in a central location and the chilled water and steam and hot water are distributed to other locations. For example, on a school campus the chiller and boiler may be located in a power plant building. The chilled water and steam are distributed to classrooms in separate buildings. A set of insulated pipelines is used to convey the chilled water from the chiller to other locations and back to the chiller. Another set of insulted pipelines is used to carry the steam or hot water from the boiler to the other locations and back to the boiler. It is necessary for the pipes to be insulated in order to retain the internal temperature of the medium being transported and keep heating and cooling losses at a minimum. The insulated pipelines are usually located underground.

So called "pre-insulated piping systems" of the type under consideration are conventional and commercially available. There are predominately two types of such pre-insulated piping systems in use: Class-A drainable dryable testable (DDT); and polyurethane or polyisocyanurate "fully bonded" foam systems. In the bonded type system, the foam and outer jacket, being bonded, do not move relative to the inner pipe. In the Class-A type system, on the other hand, the insulated inner pipe is designed to move independently of the associated outer jacket. In fact, there is an air gap between the inner pipe and outer carrier pipe in the class-A type system.

The present application is directed toward the bonded foam type system. These systems utilize a steel pipe to convey fluid, i.e., steam and/or superheated water, where the fluid is at a different temperature as compared to the ambient environment. Around the outside of the steel pipe is a layer of insulating foam such as, for example, polyisocyanurate foam. In the case of high temperature piping systems, the insulating foam serves to keep heat loss from the starting location of the pipeline to the ending location at a minimum. Around the outside of the foam is a thin jacket of thermoplastic material, such as high density polyethylene (HDPE). The plastic jacket protects the foam from mechanical damage and also provides a watertight seal to prevent corrosion of the steel pipe. Although steel is commonly used fix the inner pipe which carries the media to be piped, copper, aluminum or other metals as well as fiberglass, PVC, and similar materials may be utilized, as well.

There have been a number of efforts in the prior art to produce "pre-insulated piping" of the above described type in continuous, rather than batch or one section of the pipe at a time processes. The simplest method of producing such pipe in continuous fashion would be to move the pipe forward in a production line, as on a conveyor, while it is simultaneously being rotated and while spraying the insulating foam onto the outer surface of the pipe. The foam would then typically be enclosed with an insulating jacket, all while being rotated and passed down the conveyor line. This approach is not possible, however, in the case where heat tubes are welded to the exterior of the pipe being insulated prior to the pipe being moved down the conveyor line. The presence of heat tubes on the exterior of the steel pipe makes it impossible to rotate the pipe while moving the pipe forward. As a result, it is necessary to develop other techniques for the continuous production of "pre-insulated" piping of the type under consideration.

U.S. Pat. No. 3,223,571 is an early continuous process. A film folding device is disclosed which provides a film covering spaced about the pipe into which the foam is injected. The pipe is continuously moved through the foaming apparatus and when it emerges from the apparatus, the foam is still generally soft or gel like. It is then allowed to set up and cure.

In the '571 process, as with other similar processes, a relatively complex molding apparatus is employed to accommodate the expansion and setting-up of the foam as the pipe is continuously moved through the molding apparatus. Many of these molding devices were designed similar to "corrugators" of the type used to manufacture corrugated plastic pipe. They featured relatively complicated and expensive endless complimentary moving die systems. Such a system is shown in FIG. 6 of U.S. Pat. No. 3,876,355. FIG. 3 of U.S. Pat. No. 7,824,595 shows another such complicated "corrugator-style" molding apparatus in which a series of endless belt mold sections form a semi-cylindrical recess for shaping the foam insulation as it passes through the apparatus. The molds are generally moveable at approximately the same rate as the pipe as it moves axially downstream through the mold apparatus.

While the above and similar processes may have succeeded in producing pre-insulated piping in continuous fashion, the molding apparatus section of the process was overly complex and expensive to produce. Also, since the apparatus could only produce one size (diameter) of pre-insulated pipe, it would be necessary to undertake the expense of manufacturing a number of different molding devices to accommodate the manufacture of pipe of various diameters.

Thus, there continues to be a need for improvements in the pre-insulated piping manufacturing processes, particularly in continuous pip production processes.

SUMMARY OF THE INVENTION

The present invention concerns a continuous process for the production of pre-insulated metal piping systems, such systems often being used in commercial and industrial settings, such as school campuses, hospital complexes and other distributed HVAC settings where hot or cold fluids are being transported. The system may be carrying steam in an underground piping system, for example.

It is one object of the present invention to provide a continuous process for the production of pre-insulated piping in which the previously overly complicated "corrugator" type molding apparatus is replaced with a much simpler "drum-roller", to be described in the written description which follows.

The particular piping systems under consideration are familiar to those skilled in the relevant industries. Such piping systems are made up of first and second lengths of insulated and jacketed pipe, each having a joining end to be joined to an end of the other length. Each pipe length comprises an inner metal carrier pipe having an interior surface and an exterior surface. An envelope of foamed insulation surrounds the inner metal carrier pipe exterior surface. An outer protective jacket typically surrounds the envelope of insulation. The joining ends of adjacent metal carrier pipe lengths are welded together to form fixed joints, whereby the adjacent pipe lengths provide a continuous length of fluid conduit for conveying, for example, high temperature fluids.

In the continuous production method of the invention, a particular type of molding apparatus is provided for forming an annulus about a pipe to be insulated into which foaming material can be injected. In a first step in the process, a synthetic polymeric film is fed to a film folder that surrounds a portion of the pipe to be insulated with film, forming an annular region between an interior surface of the film and an exterior surface of the pipe to be insulated. Each section of pipe being insulated has a leading end which is fed through the molding apparatus in an axial direction so that the leading end of the pipe pulls the film in an axial direction as the pipe to be insulated is moved through the molding apparatus and through the annulus.

A foaming material is injected into the annular region between the pipe exterior and the film interior as the pipe moves through the molding apparatus by injecting the foaming material into an end opening of the annular region. Supports are provided for supporting the pipe as it is fed into the molding apparatus and for supported the insulated pipe emerging from the molding apparatus. The foaming material is continuously molded to a substantially uniform radial thickness. The foaming material is cured to form a foam insulated pipe.

The special molding apparatus used in the process of the invention is a specially designed roller-drum having a metal roller-drum body. The metal roller-drum body has a cylindrical length, an interior surface, an exterior surface, and a plurality of individual rollers arranged in a series of linearly staggered, circular roller arrays. Each of the individual rollers is retained in, and free to rotate in, a window opening provided in the cylindrical length of the roller-drum body.

The linearly staggered, circular arrays of rollers comprise a series of linearly aligned rollers which make up longitudinal columns when the roller-drum is cut in half and viewed in planar fashion, there also being intermediate rows of rollers running in radial relationship to the columns which form offset rows of rollers in the linearly staggered, circular roller arrays. The offset rows and columns of rollers in the linearly staggered roller array provide approximate 100% coverage of the foam covered film as the pipe passes through the molding apparatus, providing an annular expansion area about the pipe for the foaming material.

The foaming material which is utilized will typically be a curable foam insulation selected from the group consisting of polyurethane foams and polyisocyanurate foam. The use of these type foaming materials is conventional in the industry. The process may further include the step of extruding a polyolefin coating around at least a portion of the pipe with the insulation thereon to thereby form an outer protective jacket for the insulated pipe. The lengths of insulated piping being joined may be part of a pipeline conveying steam, hot water or other hot or cold fluids.

Additional objects, features and advantages will be apparent in the written description which follows.

DETAILED DESCRIPTION OF THE INVENTION

Figure 1:
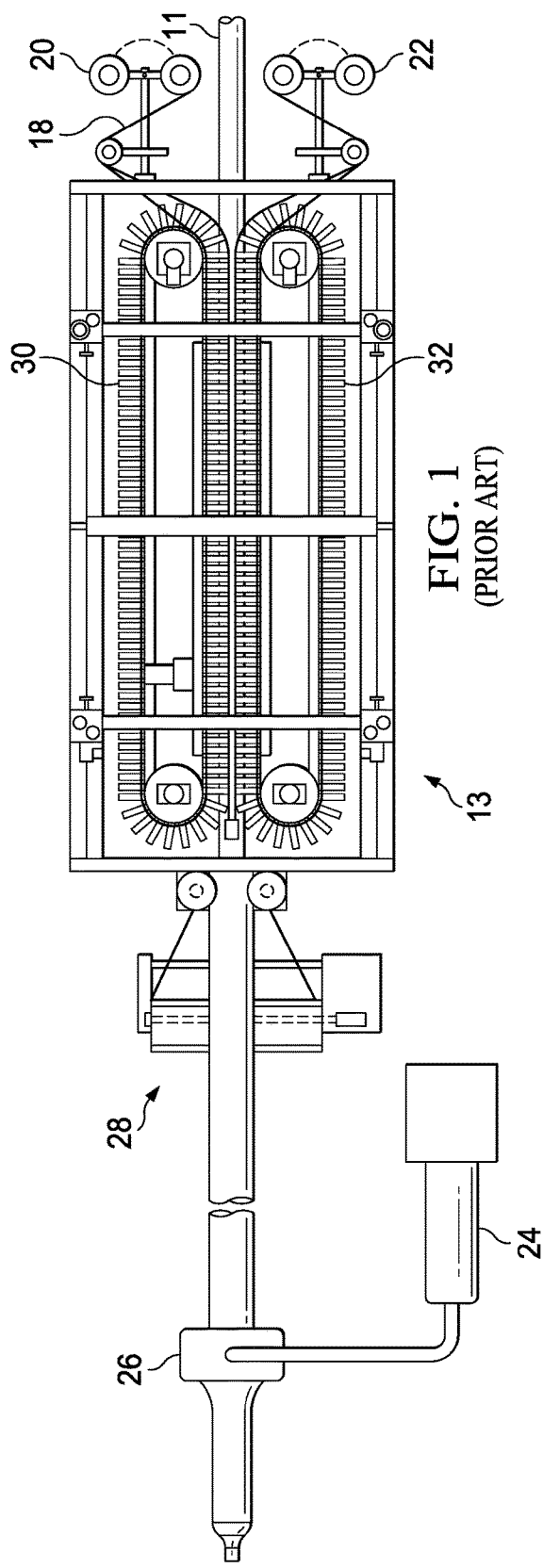
FIG. 1 is a simplified representation of a prior art process for the continuous production of pre-insulated piping of the type under consideration.

The preferred version of the invention presented in the following written description and the various features and advantageous details thereof are explained more fully with reference to the non-limiting examples included in the accompanying drawings and as detailed in the description which follows. Descriptions of well-known components and processes and manufacturing techniques are omitted so as to not unnecessarily obscure the principle features of the invention as described herein. The examples used in the description which follows are intended merely to facilitate an understanding of ways in which the invention may be practiced and to further enable those skilled in the art to practice the invention. Accordingly, the examples should not be construed as limiting the scope of the claimed invention.

As has been briefly described, the particular type of piping system under consideration includes lengths of insulated and jacketed pre-insulated piping and, more specifically to a bonded foam pre-insulated piping system; i.e., the piping is made up of an inner carrier pipe having an interior surface and an exterior surface with an envelope of foamed insulation surrounding the inner pipe exterior surface. The envelope of foamed insulation can be, for example, an insulating material selected from the group consisting of polyurethane foams and high temperature polyisocyanurate foams. An outer protective jacket surrounds the envelope of insulation. The outer jacket can conveniently be formed from high density polyethylene. Each length of piping has a joining end for joining to an adjacent length of piping, whereby the adjacent lengths of piping provide a continuous length of fluid conduit for conveying high temperature fluids. The section of piping, as previously described, is installed in a piping system made up of other sections of piping.

One example of a commercially available pre-insulated piping system of the above type is the "HT-406"™ High Temp Steel Piping System sold by Thermacor Process, Inc., 1670 Hicks Field Road East, Fort Worth, Tex. 76179. The following references, among others, teach the manufacture of such prior art systems: U.S. Pat. Nos. 3,793,4111; 4,084,842; and 4,221,405, all to Stonitsch et al.; as well as U.S. Pat. Nos. 6,547,908; 5,736,715; 7,037,557; 7,418,979; and 9,377,150, all assigned to Thermacor Process, Inc., the assignee of the present invention.

Any reference in this discussion to "sections" or "lengths" of pipe is intended to refer to standard available factory pre-insulated piping of the type previously described having an inner metal pipe surrounded by an envelope of foamed insulation, which in turn, is contained within a polyolefin jacket. As referred to briefly above, typical commercial practice involves the use of steel, copper, aluminum or alloy metal material for the inner carrier pipes. The typical pipe diameters will be, for example, 4 inches to 12 inches. For high temperature systems, the surrounding envelope of foam insulation is typically formed of closed cell polyisocyanurate. The outer protective jacket can be formed of a suitable polyolefin, such as polypropylene, polybutylene, polyethylene, polyvinylchloride and similar protective jackets.

The term "high temperature", as used in this discussion, means that the pipelines are conveying fluids at temperatures above ambient, typically at temperatures of 212° F. and above. In some cases, temperatures of 350°-400° F. and higher will be encountered. The expected operating temperature of the pipeline will determine the type of outer foam insulation utilized. For example, 250° F. is generally accepted as the present temperature limitation at which polyurethane foam is used in bonded foam systems. Temperatures above about 250° F. generally require the use of higher temperature foams, such as the previously mentioned polyisocyanurate foam. The piping systems of the type illustrated in the drawings and described in the discussion which follows are typically utilized to convey fluids at high temperature and/or pressures. For example, a typical steam line might be conveying fluid at, for example, 250-350° F.

The above referenced U.S. Pat. No. 7,037,557, assigned to Thermacor Process, Inc., describes one prior art "batch" manufacturing process in which the inner metal carrier pipe is surrounded by an outer thermoplastic jacket which is positioned by means of standoff's. A waterstop is placed at one end. The foam insulating material from a suitable supply source is then pumped into the annular space between the pipe exterior and the interior of the thermoplastic jacket and allowed to expand and set. A second waterstop is then installed at the opposite end of the section of pipe. The thickness of foam in the annulus will typically be at least about 2.5 inches.

While the "batch" process is certainly capable of producing acceptable product, it is obviously limited in terms of throughput per hour. One use of the pre-insulated piping systems of the invention is in pipelines used in the delivery of petroleum and petroleum products over long distances, e.g., 100-200 mile distances, or further. The batch processes are generally too slow and time consuming and require too much handling of the pipe being processed to be efficient in such situations. There is obviously a need to provide a continuous process for producing such pre-insulated piping in order to supply a greater length of piping in a shorter amount of time.

In addition to the above-described "batch" process, prior art "continuous" processes are also known. For example, the following patents show such continuous processes: U.S. Pat. Pub. 2015/0375433; U.S. Pat. Pub. 2011/0308659; U.S. Pat. Nos. 3,041,700; 3,876,355; 7,824,595; and WO 2011/103606, The typical prior art continuous process is presented in simplified, schematic fashion in FIG. 1 of the Drawings. In FIG. 1, an inner metal carrier pipe 11 is pulled through a molding apparatus 13, by a conventional conveyor system. The pipe 11 was typically supported by rollers (not shown) as it enters and exits the molding apparatus. In this particular process, a synthetic plastic film 18 was dispensed, as from roll stands 20, 22 and fed to a film folder where it created an annular region about the exterior of the inner carrier pipe 11. Foam, in this case a glass syntactic polyurethane, was dispensed from dispending heads into the annular region formed about the inner carrier pipe as the pipe was pulled through the mold section 13.

The mold section 13, as illustrated in simplified fashion in FIG. 1 of the drawings, was a complicated piece of machinery, typically employing continuous mold elements 30, 32, sometimes referred to as "corrugator sections." The corrugator sections featured a recycling conveyor chain or similar linking mechanism which was moveable within the mold cavity and moved the mold elements contained therein at approximately the same speed as the conduit 11 as it moved downstream through the mold section. The conveyor chains were typically driven by a separate motor from the motor that was used to axially translate the conduit 11. As the pipe emerged from the molding apparatus, it was typically passed to an extruder station 24 which extruded a synthetic outer jacket about the foam layer by means of a cross head die 26. In an alternative embodiment described in U.S. Pat. No. 7,824,595, the film 18 was sometimes removed from the cast molded conduit using a take up spool 28 positioned downstream of the mold apparatus 13.

Figure 2:
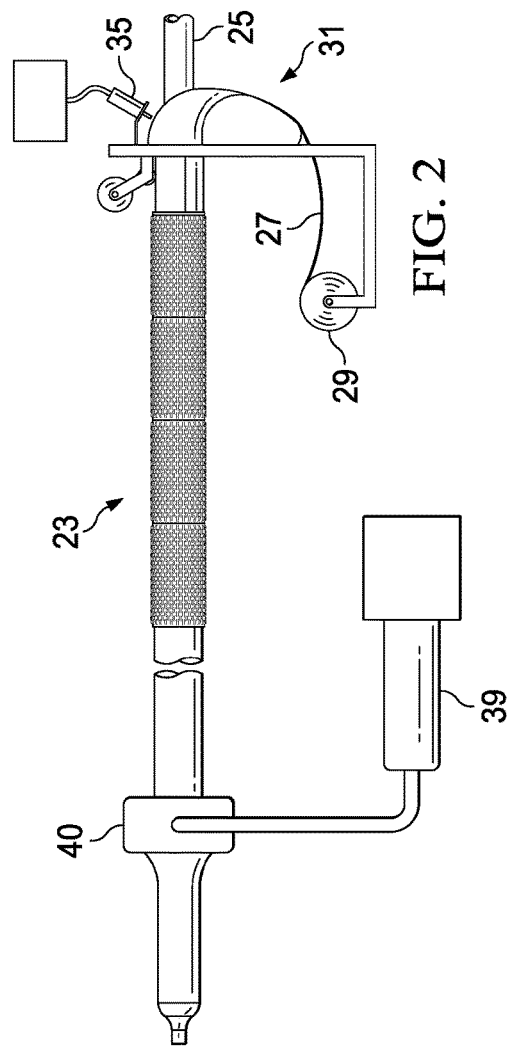
FIG. 2 is a simplified view, similar to FIG. 1, of the improved continuous process of the invention.
Figure 6:
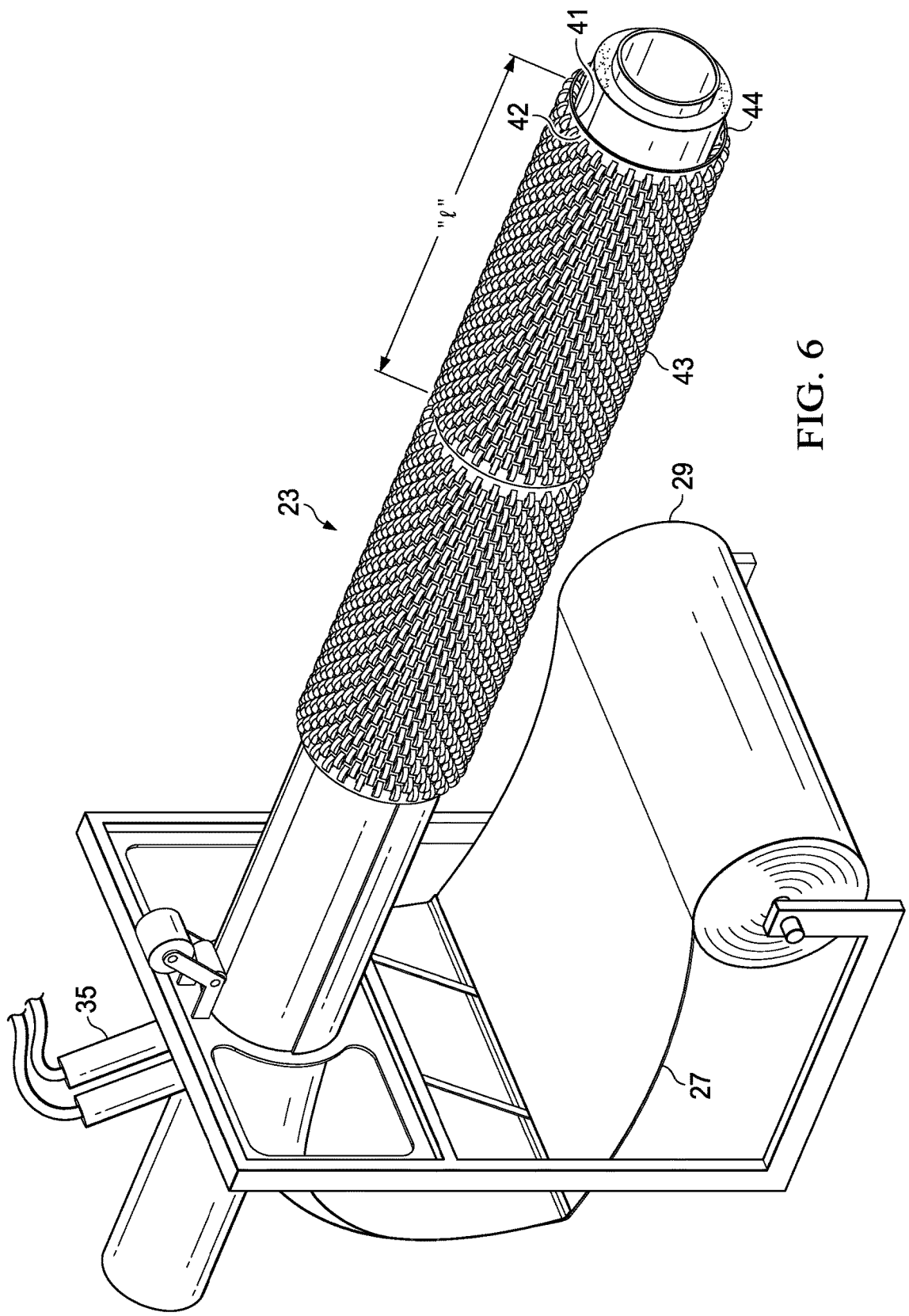
FIG. 6 is a partial perspective view of the apparatus used in practicing the method of the invention showing the end region of a section of pre-insulated piping exiting the roller-drum molding apparatus.

FIGS. 1 and 2 are intended to compare the relative complexity of the prior art process, shown in FIG. 1, to the process of the invention shown in simplified fashion for comparison in FIG. 2 of the drawings. As discussed above, one problem with the prior art continuous processes was the fact that the molding stations 13 and associated handling equipment tended to be overly complex and expensive, due in part to the previously described "corrugator sections." In many cases, the prior art processes operated in much the same way as the "corrugators" used for producing plastic corrugated pipe. Those processes also used a series of die blocks which were mounted on endless chains on either side of the inner carrier pipe and travel about and along the pipe as it moved through the manufacturing process. The complexity of such systems can be appreciated by reference to FIG. 6 of the above referenced U.S. Pat. No. 3,876,355, and to FIG. 3 of the previously referenced U.S. Pat. No. 7,824,595. In addition to the complex nature of the "corrugator" sections, a different size mold section was required for each size pipe being insulated.

Figure 2A:
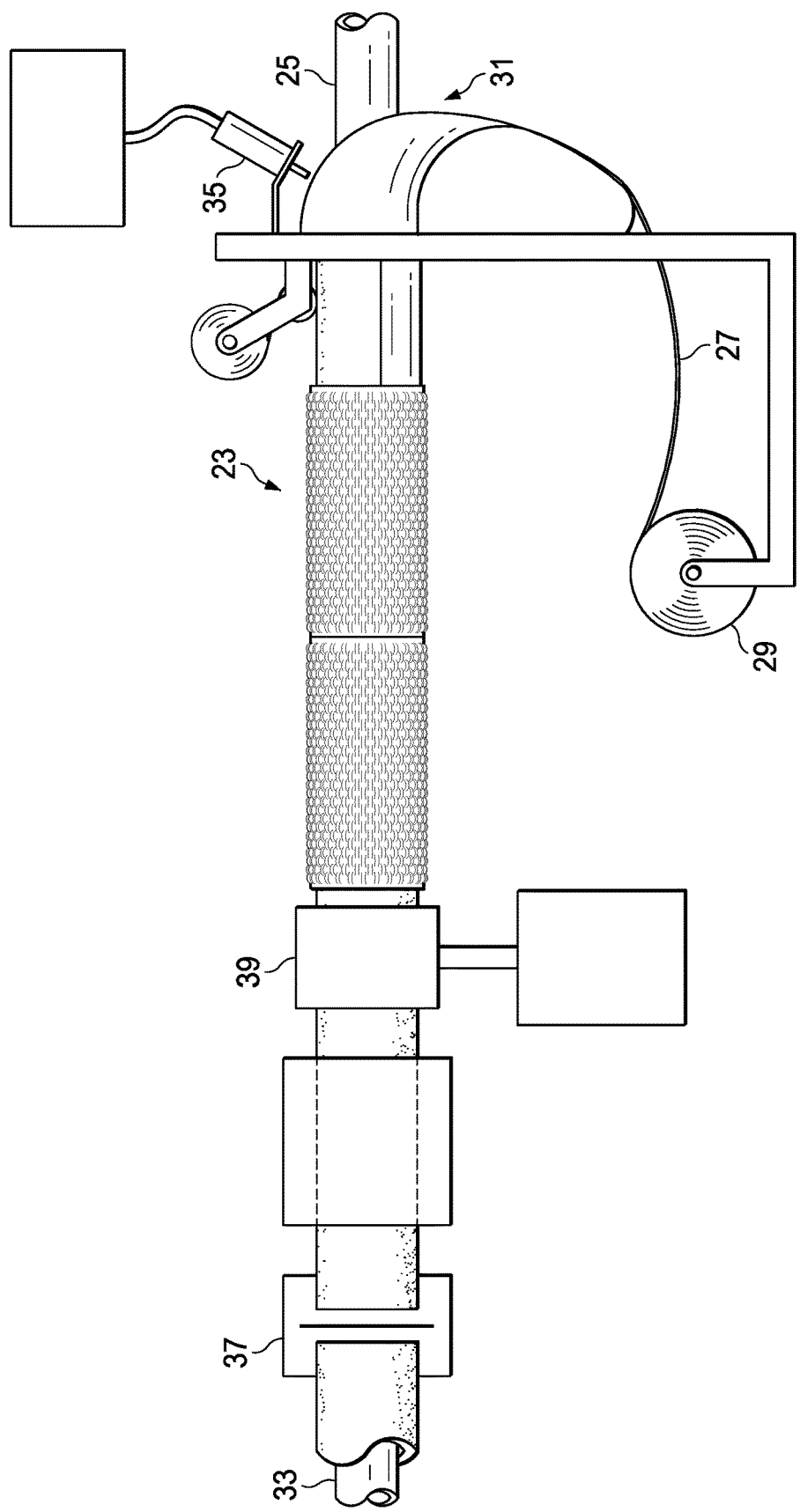
FIG. 2A is a view similar to FIG. 2, but enlarged for ease of illustration.

FIG. 2A shows the improved continuous process for producing pre-insulated piping of the invention, somewhat enlarged over the view of FIG. 2, for ease of illustration. In the process of the invention, a special molding apparatus 23 (to be further described) is provided for forming an annulus about an inner metal carrier pipe 25 to be insulated into which foam can be injected. A synthetic polymeric film 27 is fed from a roll 29 to a film folder (generally at 31) that surrounds a portion of the pipe to be insulated with film, forming an annular region between an interior surface of the film and an exterior surface of the pipe. The film folder is shown in somewhat schematic fashion in FIG. 2A, since such devices are well known in the relevant industries. The film could conveniently be, for example, a polyolefin, such as a commercially available thin polyethylene film, generally less than about 10 mils in thickness.

One such film folder is shown in U.S. Pat. No. 3,223,571, issued Dec. 14, 1965, to Straughan, the disclosure of which is hereby incorporated by reference in its' entirety. Quoting from the description of the '571 patent, the film folder described therein consists of a combination of a smooth curve, wing-shaped shoulder portions and a rearward tubular portion. A longitudinal circular opening was provided in the curved surface for the axial passage of the pipe being insulated. Extending rearwardly of shoulder portion is a flexible tubular member, overlapping split longitudinally to cause the final overlapping fold of the film about the pipe. As the film ribbon is drawn over the smooth curved shoulder portion, it is automatically shaped into a continuous tubular wrap about the pipe. The film ribbon is of sufficient width that its edges overlap when it is so folded about the pipe. A film sealing means is located behind the film folder to seal or interconnect the overlap of the film edges. This type folding operation is sometimes referred to as a "cigarette paper" type of folding operation.

In the next step in the method of the invention, the pipe 25 has a leading end (33 in FIG. 2A) which is fed through the molding apparatus 23 in an axial direction (from right to left in FIG. 2A) so that the leading end of the pipe pulls the film 27 in an axial direction as the pipe to be insulated is moved through the molding apparatus and through the annulus. At the same time, a suitable foaming material is injected into the annular region between the pipe exterior and the film interior as the pipe moves through the molding apparatus 23 by injecting the foaming material from an injector gun 35 into an end opening of the annular region formed by the film 27. It may be necessary to utilize more than one injector gun, for example, one gun above the pipe and one gun below the pipe for evenly injecting foaming material as the pipe moves through the molding apparatus.

While the pipe is moving through the molding apparatus 23, it is being supported at either end, as by a conventional roller table on the right end and by a conventional conveyor system on the left end. The foam material is continuously molded in the molding apparatus to a substantially uniform radial thickness and is cured to form a foam insulated pipe. The insulated pipe may have an outer protective jacket applied as at an extrusion station 39 with jacket material being extruded through cross head die 40. The jacket might be, for example, high density polyethylene.

The previously described method steps and apparatus are all similar to those used in various of the prior art continuous processes discussed above with one exception, instead of a "corrugator" type molding station, the process of the invention employs a special molding apparatus which is referred to herein as a "roller-drum" apparatus (23 in FIG. 2A). As will be apparent from FIGS. 2A and 6, the roller-drum apparatus comprises at least one roller-drum having a metal roller-drum body 41. The metal roller-drum body 41 has a cylindrical length ("1" in FIG. 6), an exterior surface 42 and an interior surface 44, and a plurality of individual rollers 43 arranged in a series of linearly staggered, circular roller arrays. As shown in FIG. 2A, more than one roller-drum may be used in the process, depending upon such factors as the diameter of the pipe being insulated, etc. The molding section shown in FIG. 2A has four roller drums.

Figure 3:
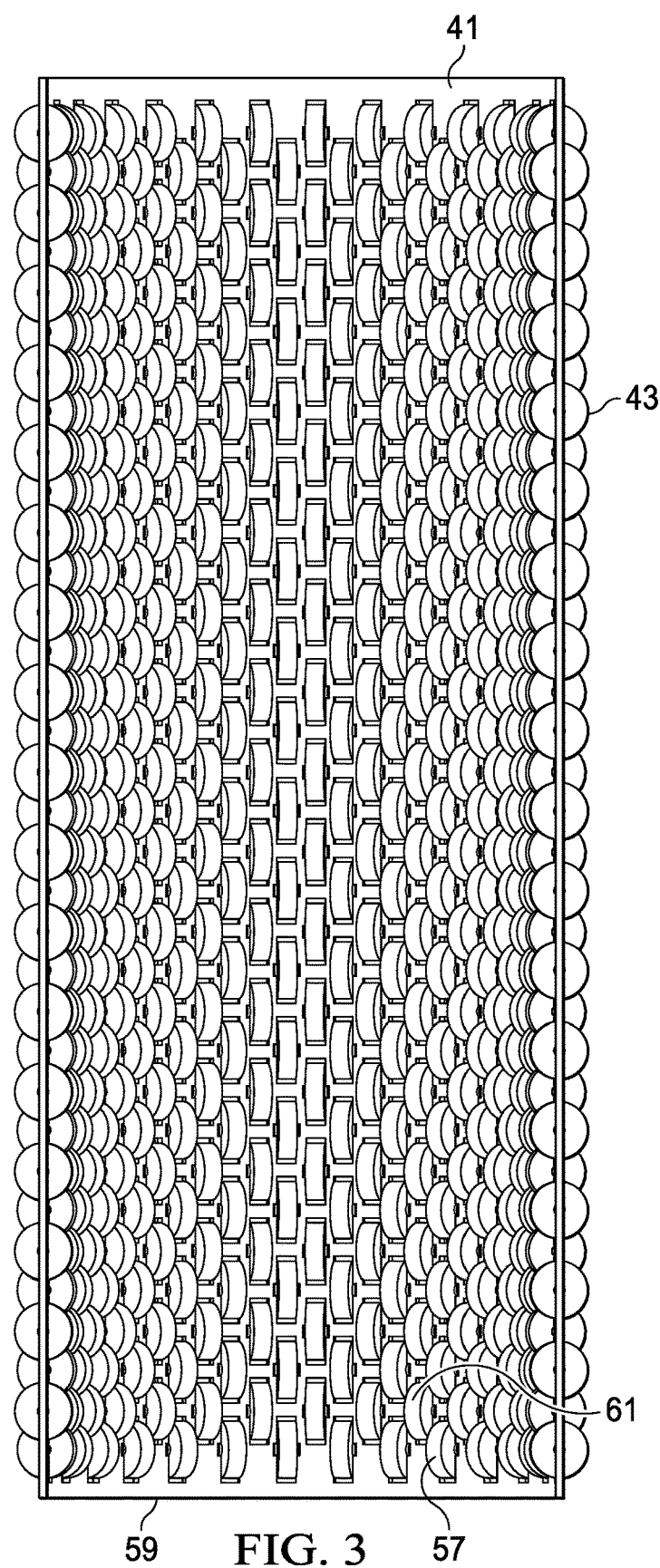
FIG. 3 is an isolated plan view of one half of the special roller-drum which is used in the improved continuous process of FIG. 2, the drum being cut in half for ease of illustration.
Figure 4:
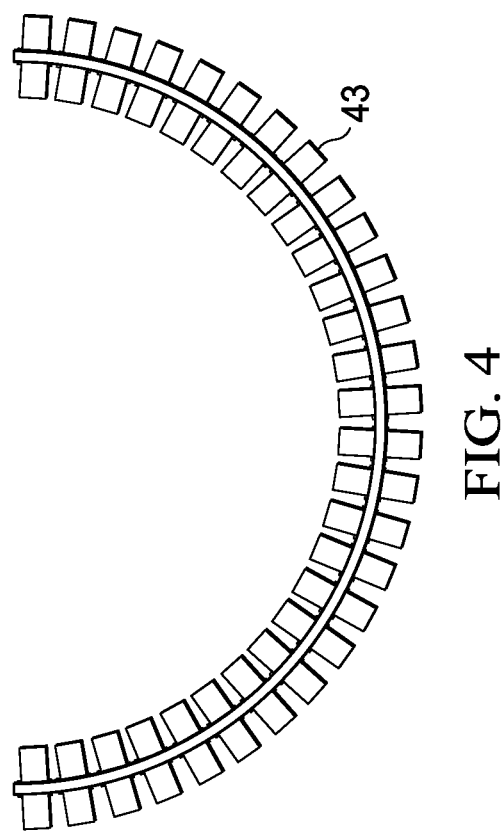
FIG. 4 is an end view of the roller-drum of FIG. 3.
Figure 5:
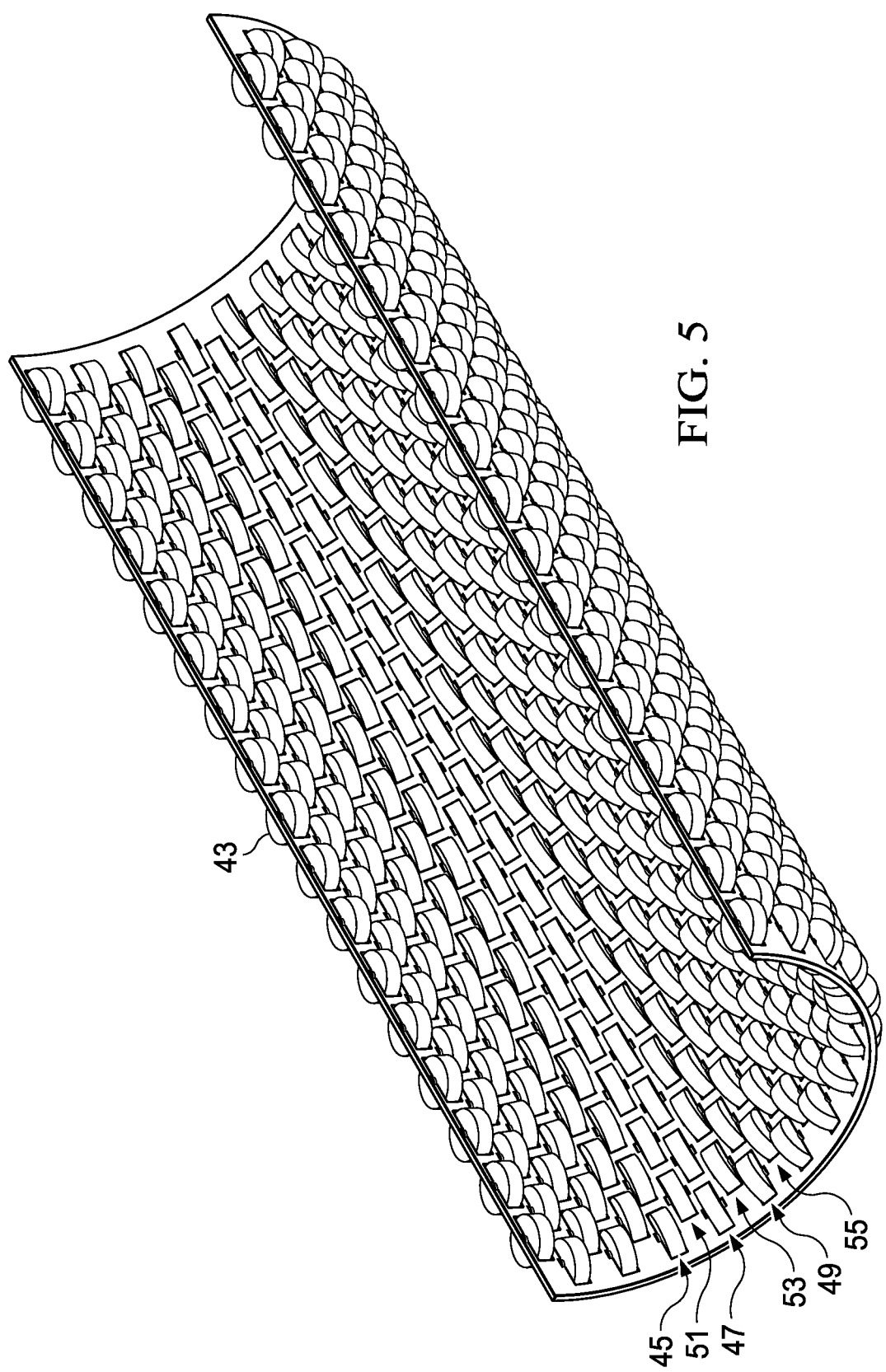
FIG. 5 is an isolated perspective view of the half portion of the roller-drum of FIG. 3.

The individual rollers 43 are shown in greater detail in FIGS. 3-5. As shown in FIGS. 3 and 5, the plurality of individual rollers 43 are each retained in and are free to rotate in a window opening provided in the cylindrical length of the roller-drum body. The window openings communicate between the interior and exterior surfaces 42, 44 of the roller-drum body 41. By "circular roller array" is meant the pattern shown in FIG. 4 of the Drawings (the roller drum being cut in half for ease of illustration. The "linearly staggered, circular arrays of rollers" comprise a series of linearly aligned rollers 43 which make up longitudinal columns (such as columns 45, 47 and 49 in FIG. 5) when the roller-drum is cut in half for ease of illustration. As also shown in FIG. 5, intermediate rows of rollers (such as the roller array shown in FIG. 4) run in radial relationship to the columns 45, 47 and 49 which form offset rows of rollers in the linearly staggered, circular roller arrays. In other words, if the column of rollers beginning with roller 57 in FIG. 3 has a center which is one inch from the outer edge 59 of the cylindrical roller-drum body 41, then the center of the column off rollers beginning with roller 61 would be located approximately 2 inches from the outer edge 59.

The arrangement of the offset rows 51, 53, 55, and columns 45, 47, 49, of rollers 43 in the linearly staggered roller array provide approximate 100% coverage of the film and expanding foam as the pipe passes through the molding apparatus 23. By "approximate 100% coverage" is meant that the resulting foam covered pipe should not have the "corrugated" look which would be produced in a corrugated pipe manufacturing process. Rather, the exterior or the cured foam should be a smooth as possible. Generally speaking, the larger the number of rollers and the longer the length of the molding apparatus, the smoother the exterior surface of the resulting foam will be.

An invention has been provided with several advantages. The roller-drum molding apparatus of the process replaces the much more complicated and expensive "corrugator" type molding stations of the prior art processes. The arrangement of the offset rows in the linearly staggered roller array provide nearly complete coverage of the film wrap, and hence the expanding foaming material while the pipe moves through the molding apparatus. This is accomplished without the use of the "travelling die blocks" and endless belts or the prior art devices. The result is a more economical process with fewer potential maintenance problems. The simplistic nature of the "roller-drum" insures that the apparatus will be long lasting and simple to maintain. It can be provided in a range of sizes for different size pipe at a much lower cost than the prior art systems.

The process of the invention can be used in situations where "heat tubes" have been welded to the exterior of the inner steel carrier pipe prior to applying the insulation, since it is not necessary to rotate the pipe as it is being fed along the conveyor path. Also, the prior art processes often tended to overspray and waste insulating foam in the case of smaller diameter carrier pipes such as are often encountered in European pipe manufacturing processes.

While the invention has been shown in only one of its forms, it is not thus limited but is susceptible to various change and modifications without departing from the spirit thereof.

What is claimed is:

1. A continuous production line for the continuous production of pre-insulated piping where the piping is made up of first and second lengths of insulated and jacketed pipe, each having a joining end to be joined to an end of the other length, each pipe length comprising an inner metal carrier pipe having an interior surface and an exterior surface, an envelope of foamed insulation surrounding the inner metal carrier pipe exterior surface, and an outer protective jacket surrounding the envelope of insulation, the joining ends of adjacent metal carrier pipe lengths being welded together to form fixed joints, whereby the adjacent pipe lengths provide a continuous length of fluid conduit for conveying high temperature fluids, the production line comprising:

a molding apparatus for forming an annulus about a pipe to be insulated into which foam can be injected and allowed to cure to thereby form a foamed insulated pipe;

a support apparatus for supporting pipe being fed into the molding apparatus and for supporting insulated pipe emerging from the molding apparatus;

a conveyance mechanism for moving the pipe to be insulated through the molding apparatus;

wherein the molding apparatus includes a roller-drum with a roller-drum body and having a cylindrical length, the roller drum body having a plurality of individual rollers set in window openings in the cylindrical length of the roller-drum body, the plurality of rollers being arranged in a series of linearly staggered circular arrays, the rollers serving to create a mold cavity for containing the foam as it cures to a substantially uniform radial thickness about the pipe being insulated;

wherein the plurality of individual rollers are each retained in and are free to rotate in a window opening provided in the cylindrical length of the roller-drum body which communicates the interior and exterior surfaces thereof, each roller having a central roller axis located at an approximate mid-region of its respective window opening; and wherein the linearly staggered circular arrays of rollers comprise a series of linearly aligned rollers which make up longitudinal columns when the roller-drum is cut in half and viewed in planar fashion, there also being intermediate rows of rollers running in radial relationship to the columns which form offset rows of rollers in the linearly staggered circular roller arrays;

wherein there are thirty or more of the linearly staggered, circular arrays of rollers set in the window openings in the cylindrical length of the roller drum body.

2. A continuous production line for the continuous production of pre-insulated piping where the piping is made up of first and second lengths of insulated and jacketed pipe, each having a joining end to be joined to an end of the other length, each pipe length comprising an inner metal carrier pipe having an interior surface and an exterior surface, an envelope of foamed insulation surrounding the inner metal carrier pipe exterior surface, and an outer protective jacket surrounding the envelope of insulation, the joining ends of adjacent metal carrier pipe lengths being welded together to form fixed joints, whereby the adjacent pipe lengths provide a continuous length of fluid conduit for conveying high temperature fluids, the production line comprising:

a molding apparatus for forming an annulus about a pipe to be insulated into which foam can be injected;

a support apparatus for supporting pipe being fed into the molding apparatus and for supporting insulated pipe emerging from the molding apparatus;

a conveyance mechanism for moving the pipe to be insulated through the molding apparatus;

a film folder for feeding a synthetic polymeric film to the molding apparatus, whereby the synthetic polymeric film forms an annular region between an interior surface of the film and an exterior surface of the pipe;

wherein the pipe has a leading end which is fed through the molding apparatus in an axial direction so that the leading end of the pipe pulls the film in an axial direction as the pipe to be insulated is moved through the molding apparatus;

at least one injector head for injecting a foaming material into the annular region between the pipe exterior and the film interior as the pipe moves through the molding apparatus by injecting the foaming material into an end opening of the annular region;

wherein the molding apparatus comprises a roller-drum with a metal roller-drum body, the metal roller-drum body having a cylindrical length, an exterior surface and an interior surface, the roller drum body having a plurality of individual rollers set in window openings in the cylindrical length of the roller-drum body, the plurality of rollers being arranged in a series of linearly staggered circular arrays;

wherein the plurality of individual rollers are each retained in and are free to rotate in a window opening provided in the cylindrical length of the roller-drum body which communicates the interior and exterior surfaces thereof, each roller having a central roller axis located at an approximate mid-region of its respective window opening;

wherein the linearly staggered circular arrays of rollers comprise a series of linearly aligned rollers which make up longitudinal columns when the roller-drum is cut in half and viewed in planar fashion, there also being intermediate rows of rollers running in radial relationship to the columns which form offset rows of rollers in the linearly staggered circular roller arrays; and wherein the offset rows and columns of rollers in the linearly staggered roller array provide approximate 100% coverage of the film and expanding foam as the pipe passes through the molding apparatus;

wherein there are twenty or more of the linearly staggered, circular arrays of rollers set in the window openings in the cylindrical length of the roller drum body.

3. The production line of claim 2, wherein the foam insulation is selected from the group consisting of polyurethane foams and polyisocyanurate foam.

4. The production line of claim 3, further comprising:

an extrusion station for extruding a polyolefin coating around at least a portion of the pipe with the insulation thereon to thereby form an outer protective jacket for the insulated pipe.

5. The production tine of claim 4, wherein the pipe being insulated is a metal carrier pipe formed of steel of a given gauge.

6. The production line of claim 5, wherein the outer protective jacket is a high density polyethylene jacket material.

* * * * *